March 19, 1973
L. MERVYN
3,798,211
PROCESS FOR REMOVING CYANIDE IONS FROM
SOLUTIONS OF COBALT (I) CORRINOIDS
Filed Nov. 30, 1970
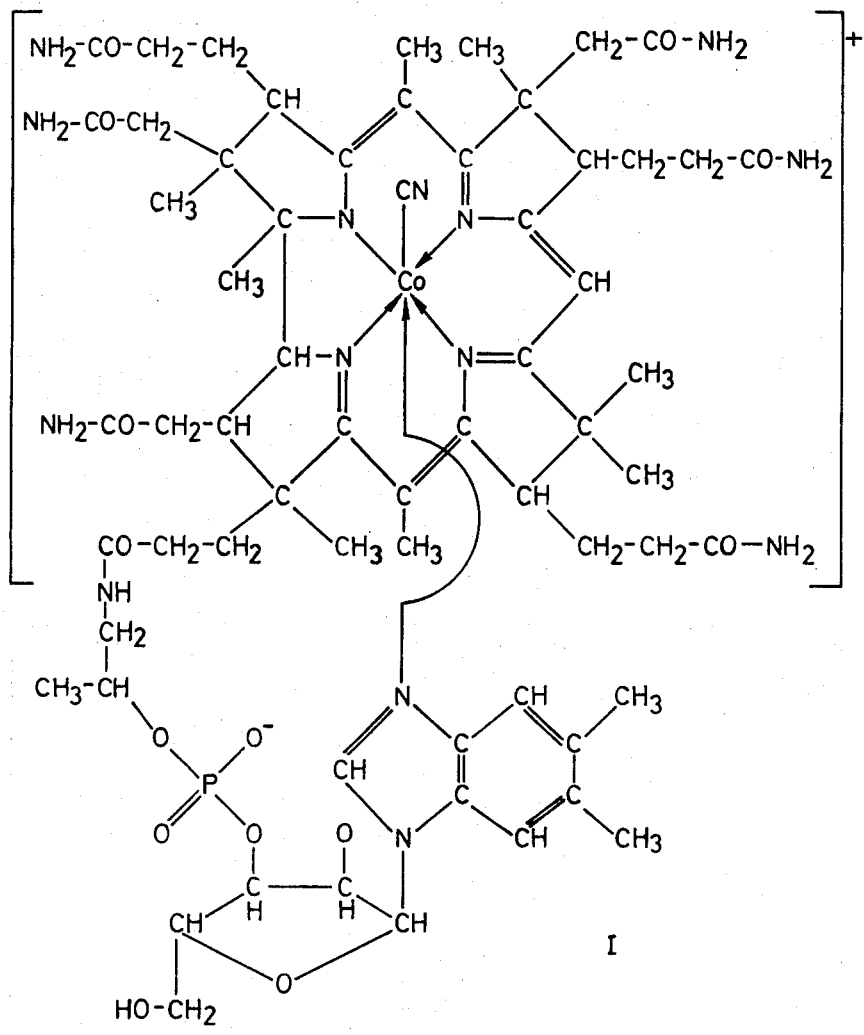
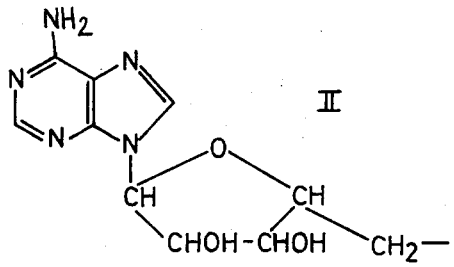
INVENTOR
LEONARD MERVYN
BY
Bacon & Thomas
ATTORNEYS

United States Patent Office 3,798,211
Patented Mar. 19, 1974

3,798,211
PROCESS FOR REMOVING CYANIDE IONS FROM SOLUTIONS OF COBALT (I) CORRINOIDS
Leonard Mervyn, Ickenham, England, assignor to Glaxo Laboratories Limited, Greenford, England
Filed Nov. 30, 1970, Ser. No. 93,777
Claims priority, application Great Britain, Dec. 1, 1969, 58,631/69
Int. Cl. C07d 55/62
U.S. Cl. 260—211.7
10 Claims

ABSTRACT OF THE DISCLOSURE

Free cyanide ions occurring in an alkaline solution of a cobalt (I) corrinoid formed by reduction of a corresponding cyano cobalticorrinoid, can be removed so that they no longer interfere in subsequent reactions of the cobalt (I) corrinoid: the removal is effected by providing a cyanide-complexing agent in said alkaline solution.

---

This invention relates to a process for removing cyanide ions from solutions of cobalt (I) corrinoids prepared by reduction of cyano-cobalticorrinoids.

Vitamin $B_{12}$ appears to play an important role in a number of biochemical processes and in particular in nucleic acid synthesis. In many such processes, it has been suggested that the vitamin is active in the form of an adenosyl derivative termed, for convenience, vitamin $B_{12}$ coenzyme and in the form of methylcobalamin; it has been suggested that these coenzymes may find particular application in the treatment of pernicious anaemia. Much research is at present being carried out to determine the true function of these coenzymes in cell metabolism and there exists a demand for a synthetic method of preparing them from the more readily available vitamin $B_{12}$, both in the normal and radio-active forms.

The derivatives of vitamin $B_{12}$ are of particular use in experimentation and therapy based on vitamin $B_{12}$ metabolism. A number of derivatives are especially valuable as antimetabolites of the coenzymes, so serving to retard processes in which the vitamin plays an essential part. Compounds of special utility include, in particular, the coenzyme analogues formed from vitamin $B_{12}$ analogues which themselves function as antimetabolites.

The structure of vitamin $B_{12}$ has been shown to be that of Formula I shown in the accompanying drawings. It has now been found that in the coenzyme form, the —CH group is replaced by a methyl group or 5'-deoxyadenosyl group of the Formula II shown in the accompanying drawings, linked at the 5'-carbon atom of the ribose molecule directly to the central cobalt atom.

A large number of analogues of vitamin $B_{12}$ are known in which the molecule has been modified at one or more positions. Thus, for example, the various amide carrying side chains may be modified e.g. by removing the —$NH_2$ groups to form free acids which may, if desired, be converted into other derivatives, for example esters or other amides e.g. arylamides (see "Vitamin $B_{12}$"; E. Lester Smith; Methuen). The 5,6-dimethyl-benzimidazole part of the molecule may, if desired, be replaced by other heterocyclic bases having two or more nitrogen atoms in the ring, e.g. other benzimidazoles, for example benzimidazole, 5-hydroxy-benzimidazole or naphthimidazole or by purine or pyrimide bases, for example adenine, xanthine, hypoxanthine, guanine, 2-methyl adenine, 8-azaadenine or 2,6-diaminopurine. (Lester Smith, loc. cit.). The ribose moiety of the molecule may be attached to the phosphate group at a different carbon atom and the isopropylamino group linked to the phosphate group may also be replaced by other alkylamine chains (Heinrich, Friedrich and Riedel (1961) Biochem, Zeit. 334, 284).

The CN group can also be replaced by another group e.g. by a hydroxyl, nitrite, thiocyanate or sulphite group. A further possibility is that the nucleotide moiety of the molecule may be completely absent, as in Factor B or cobinamide (Armitage, Cannon, Johnson, Parker, Lester Smith, Stafford and Todd, J.C.S. 1953, p. 3849).

For convenience, vitamin $B_{12}$, as well as certain of its analogues in which the molecule has been modified, have sometimes been referred to by the generic name "cobamides." However, cobamide is more properly only used in connection with the particular nucleus occurring in vitamin $B_{12}$ (cyanocobalamin) and it is preferable to use terminology based on corrin. Compounds containing this nucleus are known as corrinoids and the term cobalticorrinoids is used for corrinoids containing a cobalt (III) atom. (Biochim Biophys. Acta 117 (1966) 285–288).

The term cobalt (I) corrinoids is used herein for the corresponding compounds produced when cobalticorrinoids are reduced to the monovalent Co (I) oxidation state.

Our British patent specification No. 963,373 describes and claims a method of preparing vitamin $B_{12}$ coenzymes and analogues thereof in which a cobalt (I) corrinoid (referred to therein as a fully-reduced cobamide) is condensed under non-oxidizing conditions with an appropriate alkylating agent, acylating agent or sulphonylating agent.

However, the starting material for the reduction stage in that method is preferably a hydroxo-cobalticorrinoid, since cyano-cobalticorrinoids when reduced to the Co (I) form liberate cyanide ions which complete with the condensing reagent to re-form at least in part the initial cyanocobalticorrinoid and the nucleoside derivatives such as vitamin $B_{12}$ coenzyme are sensitive to cyanide ions. Thus, for example, in the preparation of vitamin $B_{12}$ coenzyme, hydroxocobalamin is normally used as starting material rather than cyanocobalamin (vitamin $B_{12}$) even though it is usually obtained from cyanocobalamin by relatively expensive procedures.

It is thus desirable to devise a method whereby a cyanocobalticorrinoid such as vitamin $B_{12}$ or a cyano analogue thereof may be used as starting material in the reduction/ alkylation method of our above British patent while avoiding interaction with free cyanide ions.

Some removal of cyanide can be effected, as disclosed in the above-mentioned patent specification, by heating the reaction medium, but the removal of gaseous HCN by this method is not complete and the corrinoid is sensitive to heat. We have subsequently found that the HCN can be removed more successfully by heating, e.g. up to about 60° C., and sparging with an inert gas such as nitrogen or argon. However, the need to use heat and possibly also relatively expensive gas naturally adds to the cost of the process and this method does not in any case completely remove the cyanide ions.

According to the present invention we provide a method for the removal of free cyanide ions occurring in an alkaline solution of a cobalt (I) corrinoid, formed by reduction of a corresponding cyano cobalticorrinoid, wherein a cyanide-complexing agent is provided in said alkaline solution so that the cyanide ions are incorporated into a complex and are no longer able to interfere in subsequent reactions of the cobalt (I) corrinoid with other reagents.

It should be noted that the reaction of the complexing agent with the cyanide ions should take place under alkaline conditions to avoid decomposition of the cyanide complex and also to increase the stability of the cobalt (I) corrinoid. The reduction of the cyanocobalticorrinoid is therefore preferably effected under alkaline conditions but is also possible to reduce the cyanocobalticorrinoid under acid conditions and then to make the solution alkaline so that the complexing agent can function.

The cyanide-complexing agent preferably contains a cyanide-complexing metal such as silver, zinc, cadmium, mercury, chromium, molybdenum, tungsten, manganese, nickel, cobalt, iron or copper, particularly copper (II) and iron (II), and is preferably a salt of said metal, e.g. a sulphate, nitrate or halide salt. Under alkaline condiitions, the complexing agent will normally be a hydroxide of the metal in equilibrium with ions of the metal concerned. Naturally the complexing agent must not be rendered ineffective by, nor interfere with, the reducing agent, if the complexing agent is to be provided in the solution before or simultaneously with the reducing agent. Furthermore, the said salt should preferably not contain anions which form stable cobalticorrinoid derivatives e.g. nitrite or sulphite ions, since these will compete in the same way as cyanide ions.

The reducing agent of choice is a complex metal hydride reducing agent and especially a borohydride e.g. an alkali metal borohydride, lor example sodium, potossium or lithium borohydride. Alternatively low-valency metal ion reducing agent, for example chromous salts such as chromous acetate, or other reducing agents for example zinc and acetic acid or hydrogen in the presence of a catalyst, for enample platinum, may be used.

Preferred complexing agents are provided by cupric salts such as cupric chloride and ferrous salts, for example ferrous sulphate. It is preferred to provide at least a stoichiometric quantity of the complexing reagent and an excess may often be advantageous. Cupric ions catalyse the reduction of cobalticorrinoids by borohydrides and some other reducing agents and are therefore especially useful and may advantageously be added in excess of the stoichiometric quantity required to complex the cyanide. The reduction is preferably effected in an inert solvent for the reactants, advantageously a polar solvent, for example water, an alkanol such as methanol or ethanol or substituted amide solvent such as dimethylformamide or dimethylacetamide. The metal salt providing the complexing agent is therefore preferably one soluble in the above types of solvent.

In the preparation of vitamin $B_{12}$ coenzyme and cobalticorrinoid analogues thereof via the cobalt (I) corrinoid, an alkylating, acylating or sulphonylating reagent is added to the reaction medium to react with the cobalt (I) corrinoid formed by reduction. As cyanide ions compete with this type of reagent, it is thus necessary to add the complexing agent as the same time as, or preferably before, the alkylating, acylating or sulphonylating reagent. It is usually more convenient to add the complexing agent before or simultaneously with the reducing agent so that the cyanide ions may be removed from solution as they are released. In a preferred embodiment of the process according to the invention, sodium borohydride is added to an aqueous solution of a cyanocobalticorrinoid containing cupric chloride or ferrous sulphate, and the alkylating, acrylating or sulphonylating agent added subsequently on completion of the reduction.

The alkylating, acrylating or sulphonylating reagent may, for example, be any of those described in our above British patent. Thus, for example, the reagent may be represented by the general formula RX in which X is an anion forming substituent, for example a halogen atom, or a sulphate, phosphate, sulphonate or oxalate group and R is an unsubstituted or substituted aliphatic group or an acyl or alkyl-, aryl- or aralkyl-sulphonyl group. In particular we have found that vitamin $B_{12}$ coenzyme and analogues thereof may be produced by reacting cobalt (I) corrinoid with a reactive derivative of a nucleoside, for example a halide or sulphonyl (e.g. tosyl or mesyl) derivative. It will be observed that R can be a sulphonyl group as in p-toluene sulphonyl halides and X also can be a sulphonate group, as in adenosine p-toluene sulphonate.

In order to ensure that the starting material is not re-oxidized, this reaction also should be effected under non-oxidizing conditions and preferably in the absence of light.

The substituent X may be for example, a halogen atom, e.g. a chlorine, bromine or iodine atom, or a radical derived from a strong inorganic or organic acid, for example a sulphate or phosphate group or an alkylaryl- or aralkyl-sulphonate group, e.g. a methylsulphonate or p-tolylsulphonate group. The group R may be a substituted or unsubstituted, saturated or unsaturated aliphatic group, for example an unsubstituted alkyl group (preferably having 1–5 carbon atoms) for example a methyl, ethyl, propyl or butyl group or an aliphatic group carrying such substituents as aryl groups (as in the benzyl group), heterocyclic groups for example pyridine, pyrimidine, piperidine, purine, adenine or uridine groups, cyclic ether or hemiacetal groups as in the saccharide or nucleoside groups, hydroxy groups as in the hydroxyethyl group, ether groups, thioether groups, carboxy groups as in carboxymethyl goup. R may also be an acyl group for example an acetyl, propionyl or benzoyl group etc. In anhydride acylating agents, R is an acyl group while X is an acyloxy group derived from a strong or weak carboxylic acid.

R may also be, as indicated above, a nucleoside residue. By the term nucleoside as used herein we mean an N-glycoside or deoxyglycoside of a heterocyclic base and include both the naturally occurring nucleosides for example adenosine, cytidine, inosine, guanosine or uridine and their deoxy-derivatives as well as synthetic glycosides formed between naturally occurring or synthetic sugars e.g. hexoses or pentoses, for example glucose, fructose, mannose, sorbose, ribose or deoxy derivatives thereof, and naturally occurring or synthetic heterocyclic bases. By the term nucleoside residue we mean a nucleoside group attached to the cobalt by a carbon-cobalt linkage, the hydroxyl group at the linking carbon atom having been eliminated. The term 5′-deoxy- or 6′-deoxy-nucleoside residue is more accurate but the shorter and more general term is used herein for convenience.

The sugar moieties may also carry, for example, protecting groups such as acetyl, isopropylidine or benzylidine groups. The heterocyclic bases include, for example, pyridine, quinoline, isoquinoline, benzimidazole, azapurine and azapyrimidine bases and especially pyrimidines and purines, for example the natural bases xanthine, ctyosine, hypoxanthine, guanine, adenine, uracil, etc. or synthetic bases, for example 8-aza-adenine, 6-aza-uracil or 5-bromo-uracil. Many nucleosides are now commercially available and can be synthesized by the methods of Duschinsky, Bleven and Heidelberger (1957) J.A.C.S. 79, 4559; M. J. Hall (1960) Ph.D Thesis, University of Manchester; Lee Benitz, Anderson, Goodman & Harper, (1961) J.A.C.S., 83, 1906 and Blackburn and Johnson (1960), J.C.S. 4347. The preferred reactive derivatives of nucleosides are the toluenesulphonyl (tosyl) and methane sulphonyl (mesyl) derivatives. In order to ensure that the reactive substituent is at a particularly carbon atom of the sugar moiety, the reactive derivative will often be prepared from a nucleoside in which all the hydroxyl groups in the sugar moiety have been protected, with the exception of that at the carbon atom which is eventually to be bonded to the cobalt atom. The reactive derivative may be treated to remove such protecting groups before reaction which the cobalt (I) corrinoid or such groups may be left in position. If desired, they may be removed from the resulting coenzyme or coenzyme analogue by subsequent treatment e.g. with a mineral acid for example hydrochloric or sulphuric acid or a strong organic acid for example formic acid or in many cases, e.g. with acetoxy groups, with mild bases for example alcoholic ammonia or amines for example morpholine, dilute alkali metal alkoxides, hydroxides or carbonates or, in some instances, by reduction.

Protecting groups are generally chosen for their ease of removal, for example, acyl groups for example acetyl or propionyl gorups. Where one or more pairs of adjacent hydroxyl groups are to be protected it is convenient to form an acetal or ketal derivative e.g. a benzylidene or, preferably, an isopropylidene derivative. Where sugar moiety of the nucleoside possesses a primary alcohol grouping, as in ribose or glycose it is preferred that it is the primary alcohol hydroxy group which is replaced by a more reactive substituent. Thus, for example, when it is desired to prepare vitamin $B_{12}$ coenzyme itself or an analogue differing therefrom only in the vitamin $B_{12}$ part of the molecule, the nucleoside required is adenosine and the preferred reactive derivative is 5'-(toluenesulphonyl)-andenosie or 5'-(toluenesulphonyl)-2',3'-isopropylidene-adenosine.

In that vitamin $B_{12}$ coenzyme and its close analogues are especially useful, the group R is advantageously a 5'-deoxyadenosyl group or a 2',3'-diacetyl- or 2',3'-isopropylidene-5'-deoxy-adenosyl group. R is also advantageously methyl.

Yields of the compound methylcobalamin obtained using the process of the present invention to remove cyanide ions before addition of the required reagent have been found to be of the order of 90 to 95%. Vitamin $B_{12}$ coenzyme is obtained in somewhat lower yield due to its slower formation in the reaction in competition with the tendency of the cobalt (I) corrinoids to be very readily oxidized to hydroxocobalticorrinoids. Hydroxocobalticorrinoids obtained as by-products are far more easily removed from the reaction products than unconverted or re-formed cyanocobalticorrinoids using chromatographic and ion-exchange separation techniques. For example, hydrococobalamin is strongly bound on a carboxymethylcellulose column from which methylcobalamin or vitamin $B_{12}$ coenzyme is eluted with aqueous acetone. Ferrocyanide (formed when the cyanide ions are complexed with a ferrous salt) forms a stable complex with hydroxocobalamin. This complex however may be readily removed from the desired product but, on the other hand, for re-use of the hydroxocobalamin recovery from the complex is then required. On the other hand, it is found that in slow alkylations, for example using tosyl-adenosime, the quantity of complexed hydroxocobalticorrinoid is especially high and under such circumstances a cupric salt, which does not produce a complex with hydroxocobalamin, is to be preferred. In this way, the hydroxocobalamin can be recovered and reused without any need to decompose a complex.

The desired products after alkylation etc. may conveniently be separated from salts, complexes etc. by adsorption or partition techniques. The cobalamins can be eluted from the resin column with aqueous acetone which can then be concentrated or they can be extracted into a phenolic phase followed by re-extraction into water where suitably soluble. The crude cobalamins may then if required be subjected to further chromatographic purification e.g. on a carboxymethyl cellulose and/or DEAE-cellulose column.

The following examples are provided by way of illustration only:

EXAMPLE 1

Vitamin $B_{12}$ coenzyme

Cyanocobalamin (10 g.) was dissolved in 200 ml. water and the solution transferred to a 3-necked 1 liter round bottomed flask suspended over a breaker of water placed on a heated magnetic stirrer. One neck of the flask was connected to a water-pump, one to a nitrogen (or argon) cylinder and the third held a separating funnel complete with tap. Ferrous sulphate (250 mg.) was added at this stage. The mixture was de-aerated and saturated with nitrogen for 10 minutes. Sodium borohydride (4 g.) in 20 ml. water, previously de-aerated and saturated with nitrogen, was added slowly to the cobalamin solution while a constant stream of inert gas bubbled through the solution to produce a slight positive pressure. After 10 minutes the mixture changed to the green color characteristic of fully reduced vitamin $B_{12}$ (cobalt (I) corrinoid form), and these conditions were maintained for one hour at room temperature. If the green color was not maintained, a further 0.5 g. sodium borohydride in 2.5 ml. water was added. The apparatus was shielded from light and the tosyl adenosine (prepared by direct tosylation of adenosine and containing approximately 5 g. 5'-tosyl adenosine) in 25 ml. methanol was added slowly. The resulting solution was then left for one hour at a slight positive pressure of nitrogen.

All further processing was carried out in the dark. The mixture obtained was concentrated on a rotary evaporator to remove methanol and the alkaline solution was fed onto a 1 kg. XAD–2 resin column, when the cobalamins were retained at the top. Salts were removed by washing the column with water. Cobalamins were eluted from the resin with 60% aqueous acetone which was concentrated.

The concentrated salt-free solution was run through a diethylaminoethyl-cellulose column and a carboxymethyl-cellulose column. The coenzyme band was slowly eluted with water off the carboxymethyl-cellulose column which retained strongly a small amount of hydroxocobalamin. The eluted vitamin $B_{12}$ coenzyme was concentrated and crystallized by adding 8–9 volumes of acetone. Yield 7.4 g. (72%).

Thin layer chromatography (TLC) on silica gel plates using an 8.80-ammonia:sec-butanol:water (10:190:60) solvent system gave an $R_{B_{12}}$ value of 0.5 identical with that for an authentic specimen of Vitamin $B_{12}$ coenzyme.

EXAMPLE 2

Methylcobalamin

Using a method analogous to that of Example 1, but using methyl toluene-p-sulphonate (5 g. in 25 ml. methanol) and allowing the reaction mixture to stand for only 20 minutes, methylcobalamin (9.3 g., 92%) was obtained. The product was identical with an authentic sample of methylcobalamin ($R_{B_{12}}$ 1.4 on TLC system given in Example 1).

EXAMPLE 3

Preparation of vitamin $B_{12}$ coenzyme (using cupric chloride)

Cyanocobalamin (40.0 g.) and cupric chloride (2.4 g.) were mixed with 800 ml. of water in a 3-litre 4-necked flask. The cupric chloride was completely soluble but the cyanocobalamin did not all dissolve until the reduction was arranged so that the contents could be purged of oxygen by passage of nitrogen and then the reaction conducted under a slight positive pressure of nitrogen.

The contents of the vessel were purged with nitrogen for 15 minutes. Sodium borohydride (16 g.) in 80 ml. of water was then slowly added to the cobalamin solution through a dropping funnel. Before use the borohydride solution has been purged of oxygen by passage of nitrogen. The addition of the borohydride solution lasted for 20 minutes during which time the color of the solution changed from red to dark green and all the cyanorobalamin dissolved. The reaction mixture was allowed to stand for a further 30 minutes whilst the passage of nitrogen was continued. All further operations until the final solid was obtained were conducted in the absence of light.

A slurry of 5'-tosyl adenosine (13.4 g.) in 200 ml. of 50% methanol/water was purged of oxygen and added to the reaction mixture over a period of 30 minutes. The resulting solution was allowed to stand under nitrogen for a further two hours. It was then diluted to 2 litres and filtered to remove a fine black precipitate. This alkaline solution was then passed through a 4 litre column of XAD–2 resin. The cobalamins were adsorbed onto the resin and the salts were removed by washing with 25 litres of water until the pH of the percolate was 7.0. The cobalamins were then eluted from the resin using 60% aqueous acetone. The elute was passed through a diethylaminoethyl cellulose column (400 ml.) and a carboxymethyl cellulose column (400 ml.).

The rich eluate (2.8 l.) from the carboxymethyl cellulose column was collated and the vitamin $B_{12}$ coenzyme precipitated by addition of 8 volumes of acetone. The crystals were filtered off and air dried for 24 hours. Yield 41.8 g. containing 11.8% moisture (80%).

Vitamin $B_{12}$ coenzyme

U.V. spectrum in pH 6.7 potassium phosphate buffer:

| $\lambda$ max. (nm.): | Log $\epsilon$ |
|---|---|
| 261 | 4.53 |
| 287 (shoulder) | 4.26 |
| 315 | 4.11 |
| 340 | 4.11 |
| 375 | 4.04 |
| 523 | 3.92 |

U.V. spectrum in pH 2.0 HCl/KCl buffer:

| $\lambda$ max. (nm.): | Log $\epsilon$ |
|---|---|
| 263 | 4.6 |
| 286 | 4.37 |
| 304 | 4.33 |
| 376 | 3.93 |
| 458 | 3.94 |

EXAMPLE 4

Preparation of methylcobalamin (using cupric chloride)

Using a method similar to that in Example 3, cyanocobalamin (10 g.) with cupric chloride (600 mg.) in 500 ml. of water was reduced by the addition of sodium borohydride (4 g.) in 20 ml. of water. Methylcobalamin was formed by the addition of methyl toluene-p-sulphonate (5 g.) in 30 ml. of methanol. The reaction mixture was purified using a 1 litre XAD-2 column followed by 125 ml. diethylaminoethyl cellulose and carboxymethyl cellulose columns. Yield 9.2 g. containing 7.1% moisture (86%).

Methylcobalamin

U.V. spectrum in pH 6.7 potassium phosphate buffer:

| $\lambda$ max. (nm.): | Log $\epsilon$ |
|---|---|
| 266 | 4.30 |
| 289 | 4.25 |
| 315 | 4.12 |
| 342 | 4.15 |
| 375 | 4.07 |
| 522 | 3.97 |

U.V. spectrum in pH 2.0 HCl/KCl buffer:

| $\lambda$ max. (nm.): | Log $\epsilon$ |
|---|---|
| 263 | 4.40 |
| 286 | 4.33 |
| 304 | 4.34 |
| 373 | 3.99 |
| 460 | 3.95 |

What is claimed is:

1. In a process for the preparation of cobalticorrinoid derivatives in which a cyano-cobalticorrinoid is reduced in solution to form the corresponding cobalt (I) corrinoid and free cyanide ions in said solution and in which said cobalt (I) corrinoid is then reacted in said solution with a further reagent, the improvement of adding a cyanide-complexing agent selected from the group consisting of sulphate, nitrate or halide salts and hydroxides of silver, zinc, cadmium, mercury, chromium, molybdenum, tungsten, manganese, nickel, cobalt, iron and copper to said solution and forming a complex of said free cyanide ions with said cyanide complexing agent under alkaline conditions in said solution so that the cyanide ions do not interfere with the reaction of the cobalt (I) corrinoid with said further reagent.

2. The process of claim 1 wherein the cyanide-complexing agent is a cupric salt.

3. The process of claim 1 wherein the cyanide-complexing agent is cupric chloride.

4. The process of claim 1 wherein the cyanide-complexing agent is a ferrous salt.

5. The process of claim 1 wherein the cyanide-complexing agent is ferrous sulphate.

6. The process of claim 1 wherein the reduction and complexing reactions are conducted in alkaline solution.

7. The process of claim 6 wherein the complexing agent is added to the solution before or simultaneously with the reducing agent so that cyanide ions are removed from solution as they are released.

8. The process of claim 6 wherein the reducing agent is an alkali metal borohydride and the cyanide complexing agent is a cupric salt.

9. The process of claim 8 wherein the cupric salt is added in an amount in excess of the stoichiometric amount required to complex the cyanide ions.

10. The process of claim 8 wherein the reducing agent is sodium borohydride and the cyanide-complexing agent is cupric chloride.

References Cited

UNITED STATES PATENTS

| 3,414,561 | 12/1968 | Boige | 260—211.7 |
| 3,007,916 | 11/1961 | Bernhauer et al. | 260—211.7 |
| 3,115,489 | 12/1963 | Cords et al. | 260—211.7 |
| 3,213,082 | 10/1965 | Smith et al. | 260—211.7 |
| 3,573,276 | 3/1971 | Wagner | 260—211.7 |

JOHNNIE R. BROWN, Primary Examiner